W. M. ROBERTS.
COTTON CHOPPING MACHINE.
APPLICATION FILED JULY 25, 1912.
1,076,063.
Patented Oct. 21, 1913.
2 SHEETS—SHEET 1.
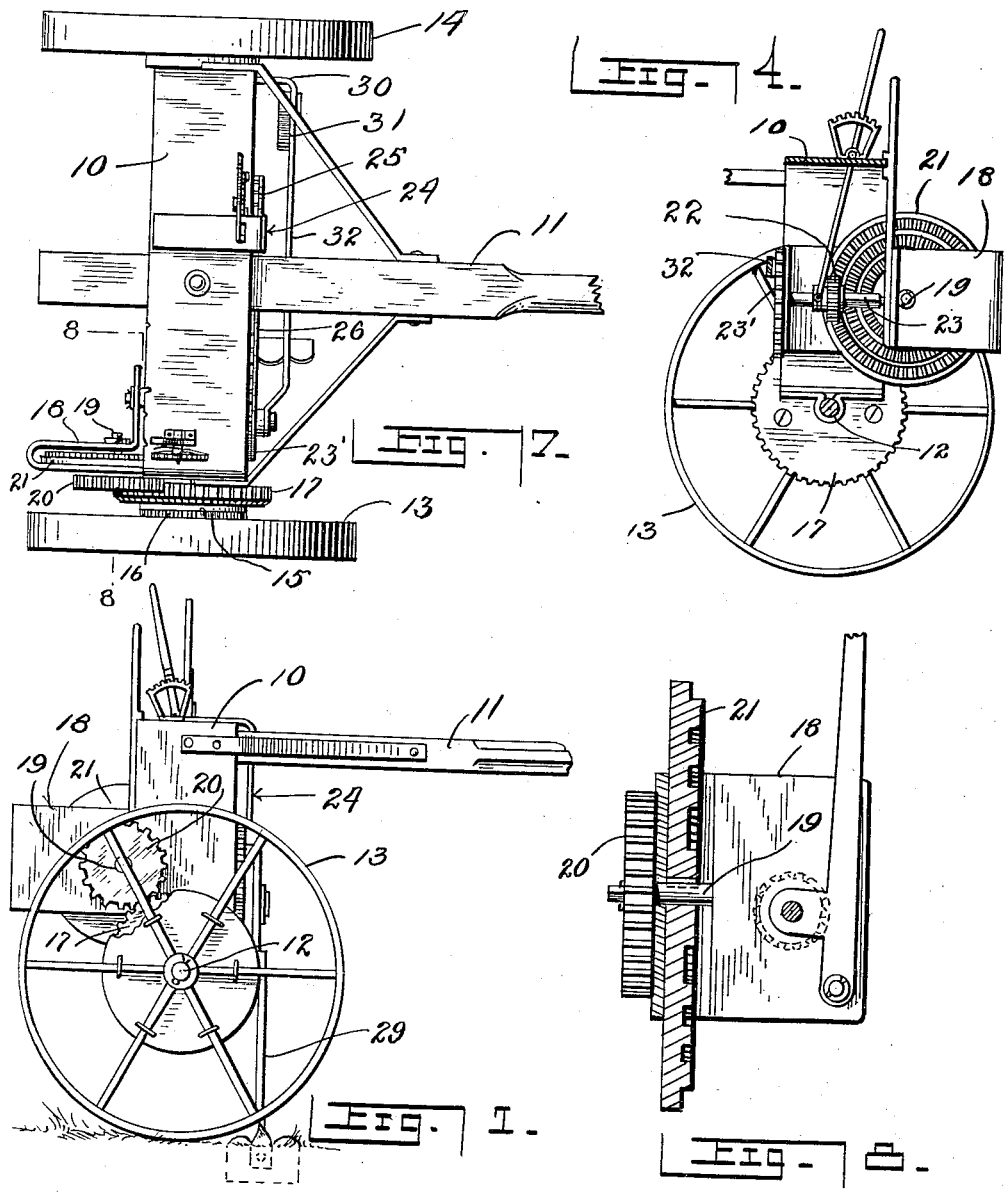

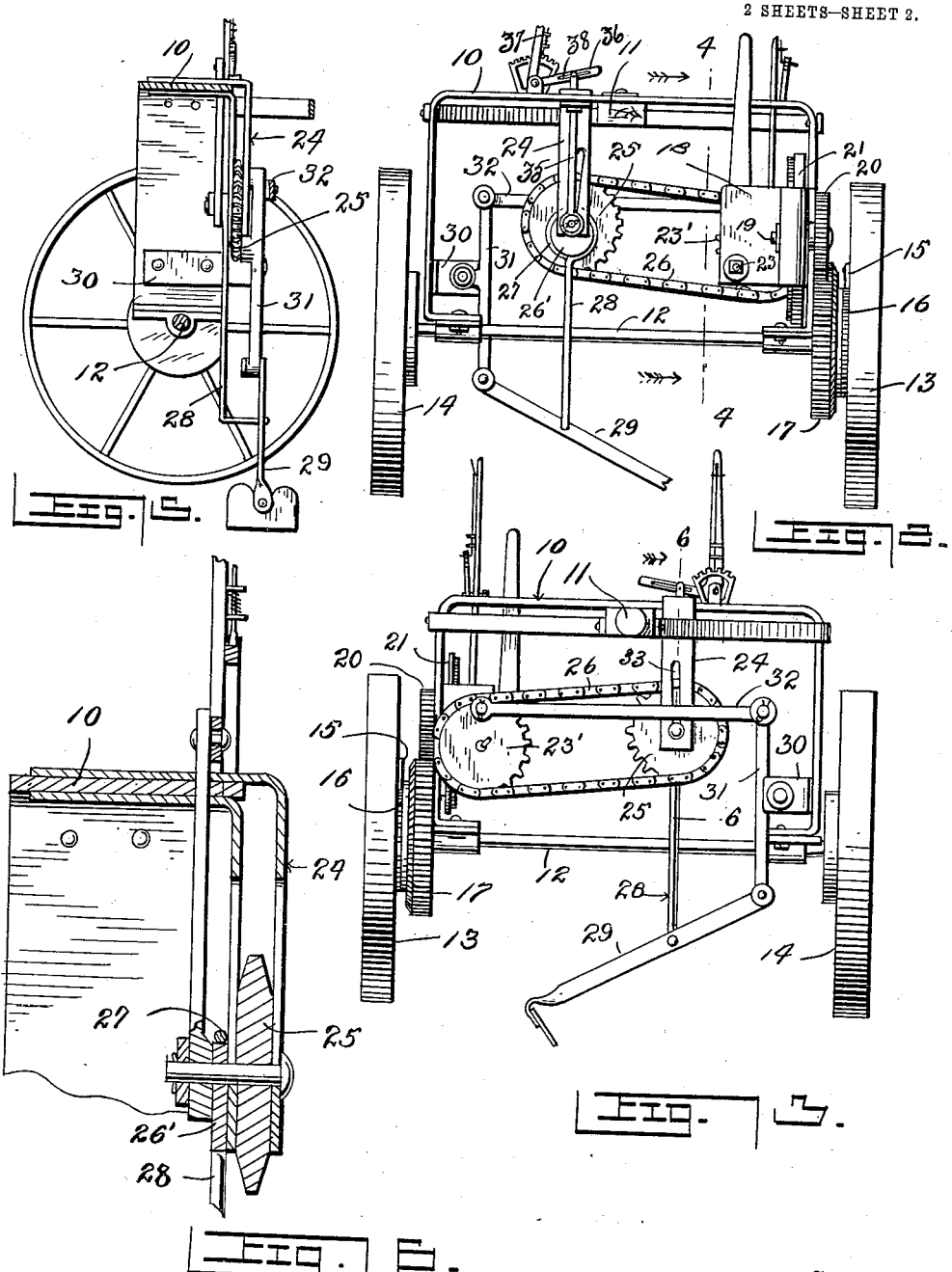

UNITED STATES PATENT OFFICE.

WILLIAM M. ROBERTS, OF INK, ARKANSAS.

COTTON-CHOPPING MACHINE.

1,076,063.

Specification of Letters Patent.  Patented Oct. 21, 1913.

Application filed July 25, 1912.  Serial No. 711,535.

*To all whom it may concern:*

Be it known that I, WILLIAM M. ROBERTS, a citizen of the United States, residing at Ink, in the county of Polk, State of Arkansas, have invented certain new and useful Improvements in Cotton-Chopping Machines; and I do hereby declare the following to be a full, clear, and exact description of the invention, such as will enable others skilled in the art to which it appertains to make and use the same.

This invention relates to improvements in cotton chopping machines, and particularly to the type which has a reciprocating pivoted hoe.

The principal object of the invention is to improve and simplify the construction and mounting of the hoe so that the action will be similar in motion to that when operated by hand.

Other objects and advantages will be apparent from the following description and with particular reference to the accompanying drawings.

In the drawings: Figure 1 is a side elevation of a cotton chopping machine made in accordance with my invention, Fig. 2 is a rear elevation of the same, Fig. 3 is a front elevation, Fig. 4 is a vertical longitudinal section on the line 4—4 of Fig. 2, looking in the direction of the arrows, Fig. 5 is a similar section on the same line looking in the opposite direction, Fig. 6 is a vertical longitudinal sectional view on the line 6—6 of Fig. 3, looking in the direction of the arrows, Fig. 7 is a top plan view of the machine, and Fig. 8 is a vertical transverse sectional view on the line 8—8 of Fig. 7.

Referring particularly to the accompanying drawings, 10 represents the arch of the frame of the machine, to which is attached the usual draft pole 11 and in the lower ends of the said arch an axle shaft 12 is journaled. On the ends of the axle outside of the frame are the ground engaging wheels 13 and 14, the former of which adheres to the axle while the latter is rotatably mounted thereon. Pivotally carried by the wheel 13 are the pawls 15 which are adapted to engage the ratchet teeth 16 formed on the side of a pinion 17 loosely mounted on the shaft adjacent the wheel 13. Mounted in the bracket 18 above the wheel 17 is a shaft 19 carrying a smaller pinion 20 for engagement with the pinion 17, and a crown gear 21 which engages with a pinion 22 on one end of a shaft 23 extending longitudinally of the machine and also mounted in the said bracket, the forward end of said longitudinal shaft carrying a sprocket wheel 23'. Mounted in a depending bracket 24 in front of the frame and on the other side of the draft pole is a second sprocket 25, said second sprocket being driven from the first sprocket by means of the chain 26. On the rear face of the last-named sprocket is an eccentric block 26' on which is mounted the eccentric strap 27. A lever 28 forming a part of the eccentric strap depends below the machine and is pivotally connected to and supports the outer end of the hoe handle 29. Pivotally mounted in a bracket 30 is a vertically disposed drop arm 31 to the upper end of which is connected one end of a link 32, which has its opposite end connected to the first-named sprocket wheel. The rear end of the hoe lever or handle is pivotally connected to the lower end of this rock arm.

As the machine moves forwardly the shaft 23 is rotated through the means of the pinion above described, and motion communicated to the eccentric carrying sprocket so that vertical motion will be imparted to the hoe at the same time that the link 32 rocks the rock arm and causes a movement of the hoe handle transversely of the frame. Thus the hoe handle is given simultaneously a vertical and transverse motion with respect to the frame of the machine, in close imitation of the motion imparted to an ordinary hoe when operated by hand. By means of the pawls and ratchet, the machine may back or turn without operating the hoe.

The rear end of the shaft 23 is journaled in the lever 32 near its lower end, said lever being pivotally attached to the bracket 18 and when said lever is thrown to the left, the rear end of the said shaft will be thrown so that the smaller pinion will be disengaged from the pinion 16 so that the machine may move without operating the hoe.

In the bracket 24 are formed the longitudinally and slightly curved slots 33 in which the shaft 34 is adapted to slide, said shaft carrying the sprocket 25 and eccentric block 26'. Loosely connected to the shaft 34 is a link 35, which extends vertically, and is pivotally connected to the arm 36 of a lever 37. This lever is pivotally mounted on the frame, as clearly shown, and upon movement of the lever the vertical stroke of the hoe is regulated. To compensate for the lateral movement of the shaft 34 as it moves upwardly, I provide an elongated slot 38 in the arm 36.

What is claimed is:

In a cotton chopping machine, an arched frame an axle mounted in the frame, and carrying ground engaging wheels, a bracket on one side of the frame, a pinion carried by one of the ground engaging wheels, a pinion on the bracket meshing with the wheel carried pinion, a crown gear on the shaft of the bracket carried pinion, sprocket wheels mounted to rotate transversely of the frame, a pinion on the shaft of one of the sprockets engaging the crown gear for driving the sprocket, a rock arm mounted on the frame, a link pivotally connected at one end to one end of the rock arm and at its other end to one of the sprockets, a hoe handle pivotally connected at one of its ends to the other end of the rock arm, an eccentric mounted on one of the sprockets and connected to the outer end of the hoe handle.

In testimony whereof, I affix my signature, in presence of two witnesses.

WILLIAM M. ROBERTS.

Witnesses:
 JNO. M. NICHOLS,
 W. R. COLE.

---

Copies of this patent may be obtained for five cents each, by addressing the "Commissioner of Patents, Washington, D. C."